UNITED STATES PATENT OFFICE 2,272,223

METHOD OF COMPLETELY STERILIZING AND PURIFYING BATHING WATER IN SWIMMING POOLS

Kurt Pietzsch, Hollriegelskreuth, near Munich, Germany, assignor to Buffalo Electro-Chemical Company, Inc., Buffalo, N. Y.

No Drawing. Application May 4, 1939, Serial No. 271,748. In Germany May 11, 1938

2 Claims. (Cl. 210—11)

The method of purifying and sterilizing the water of swimming pools by treating it with chlorine is known. Though chlorine has an excellent purifying and sterilizing action on water, it has the disadvantage that even in small amounts it imparts to water a very disagreeable smell and taste. Besides bathing in chlorinated water produces with many people of particular sensibility to chlorine inflammations, irritations and eczemes.

It has, therefore, been proposed to treat the dirty water discharged from the pool preliminarily in a circulation-conduit with chlorine as usual, and then, before its re-entry into the pool, to add a somewhat larger amount of hydrogen peroxide to it than required to destroy the excess of chlorine. Thus the water circulating in the conduit is treated with chlorine every time after leaving the pool, whilst any small excess of hydrogen peroxide that may still be present, is destroyed. After the chlorine has produced its purifying and sterilizing effect, the remaining excess is destroyed by hydrogen peroxide likewise still in the conduit, and so forth. Thus fresh water is constantly flowing into the pool and polluted water is discharged.

It is obvious that in this way the purifying and sterilizing properties of chlorine are being utilized, whilst simultaneously its disagreeable properties are eliminated. But on the other hand a different, very considerable disadvantage must be put up with, namely the fact that with such a circulation no purification and sterilization of the entire contents of the pool can ever take place. It is true, purified water is constantly flowing into the pool, but this mixes with the dirty water present in the pool. Though an excessive increase of bacteria and dirty substances is counteracted in this manner, the really desirable condition of constantly keeping the total contents of the pool clean and sterile is not attained.

One must be clear on the point that this ideal state will never be attainable. It could only be realized by addition of such enormous quantities of chlorine that any bathing in such a water would be absolutely impossible.

Another, less sure method would consist in draining the entire pool frequently, if possible once or several times daily, and in refilling it with fresh water from the main. For economic reasons this method is, of course, entirely impracticable. Even a weekly renewal of the whole contents of the pool is in most cases unbearable for the bathing establishments in most of the cases.

Contrary to it the inventor has discovered a way that permits of renewing daily practically the whole contents of the pool. The renewal is effected not by fresh water, but by the water present being wholly sterilized and purified by an extremely high concentration of chlorine. As soon as a complete sterilization and purification has been effected, the excess of chlorine is removed by addition of some dechlorinating agents e. g. hydrogen peroxide. It goes without saying that only such substances are entering into consideration as dechlorinating agents as—apart from their dechlorinating action—do not influence the appearance, odour and taste of the water in any way. Hydrogen peroxide has proved to be particularly suitable for this purpose.

The purification of the bathing-water according to the invention must naturally take place outside the bathing hours, at night for instance.

In the time between two such treatments—that is during bathing time—the water is purified in the known manner in a circulation conduit with chlorine and hydrogen peroxide. Too rapid an increase of the contents of dirt and bacteria is prevented thereby within certain limits.

The process is carried through e. g. in the following manner: In the evening after closing the bathing-establishment for the public, the water is circulated in the circulation conduit, whilst it is chlorinated to a very high degree. In doing so, the concentration of chlorine in the circulation conduit may be, if need be, increased up to 10 grams per cubic meter. The circulation is continued, until the entire water of the pool shows a content of chlorine of .1–2 grams, preferably of .3–.7 gram per cubic meter. The time required for the attainment of this concentration depends on the size of the pool and the capacity of the pump and the conduit. Under the conditions usually existing in bathing-establishments the desired concentration is reached in about 2–4 hours.

The concentration mentioned gives the absolutely sure guarantee that germs and bacteria of any kind are killed in a few minutes.

After having obtained the desired concentration of chlorine, the addition of chlorine is terminated, whilst the circulation is continued, and instead the addition of hydrogen peroxide is commenced. After some time the excess of chlorine is destroyed in the whole pool and in the morning when the bathing-time begins, the water present in the pool is completely free from germs and practically free from chlorine and hydrogen peroxide. During the bathing-time the circulation is carried through as usual with simultaneous addition of chlorine and hydrogen peroxide, and thus too great a pollution is prevented, as far as possible. In the evening the total purification is resumed again and so forth.

It is, of course, also possible to effect the chlorination and the subsequent treatment with hydrogen peroxide in the pool itself. In this case the chlorine and hydrogen peroxide respectively are delivered directly at the bottom of the pool through suitable distributing means. This measure will be necessary above all in such cases where there is no circulation-conduit or only a poorly dimensioned one, which is sometimes the case above all with open-air baths.

In general the dosage of the hydrogen peroxide addition will be such that just the existing surplus-amount of chlorine is destroyed. But it is also possible to add a somewhat larger amount of hydrogen peroxide and to render thereby the slightly sterilizing property of the hydrogen peroxide effective in the pool.

What I claim is:

1. The method of sterilizing and purifying bathing water in swimming pools by the use of chlorine and a dechlorinating agent which comprises chlorinating the entire water present in the pool to 0.3–0.7 gram per cubic meter while the pool is not in use, thereafter eliminating excess chlorine by addition of a dechlorinating agent and then sterilizing while the pool is in use by continuously adding chlorine and then a dechlorinating agent to small portions of the pool water and adding this to the pool while at the same time withdrawing an additional portion for such treatment.

2. The method of sterilizing and purifying bathing water in swimming pools by the use of chlorine and hydrogen peroxide which comprises chlorinating the entire water present in the pool to a high concentration of chlorine suitable for complete sterilization while the pool is not in use, that is, 0.3–0.7 gram chlorine per cubic meter, thereafter eliminating excess chlorine by addition of hydrogen peroxide and then sterilizing while the pool is in use by continuously adding chlorine and then hydrogen peroxide to small portions of the pool water and adding this to the pool while at the same time withdrawing an additional portion for such treatment.

KURT PIETZSCH.